Patented Jan. 4, 1927.

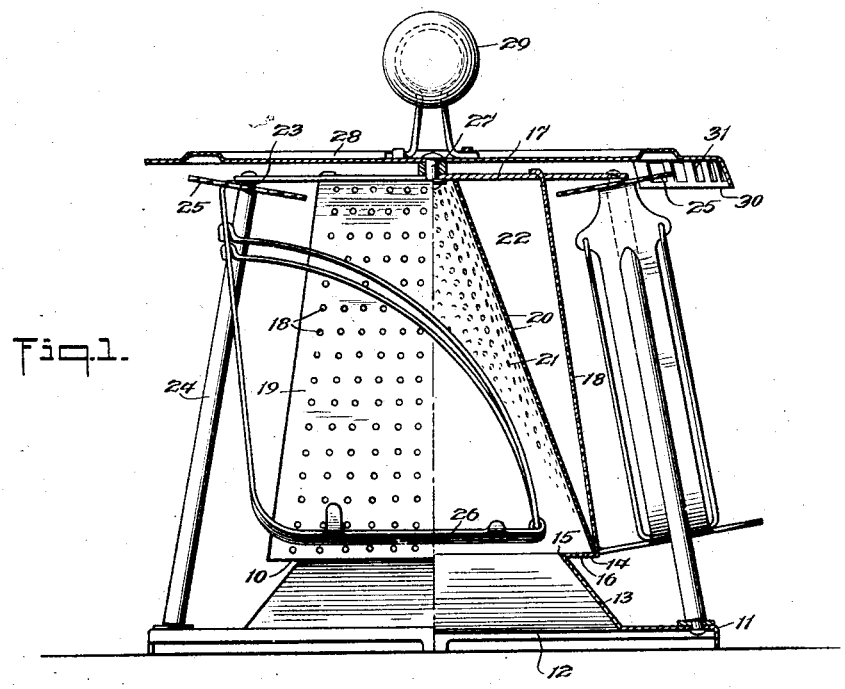
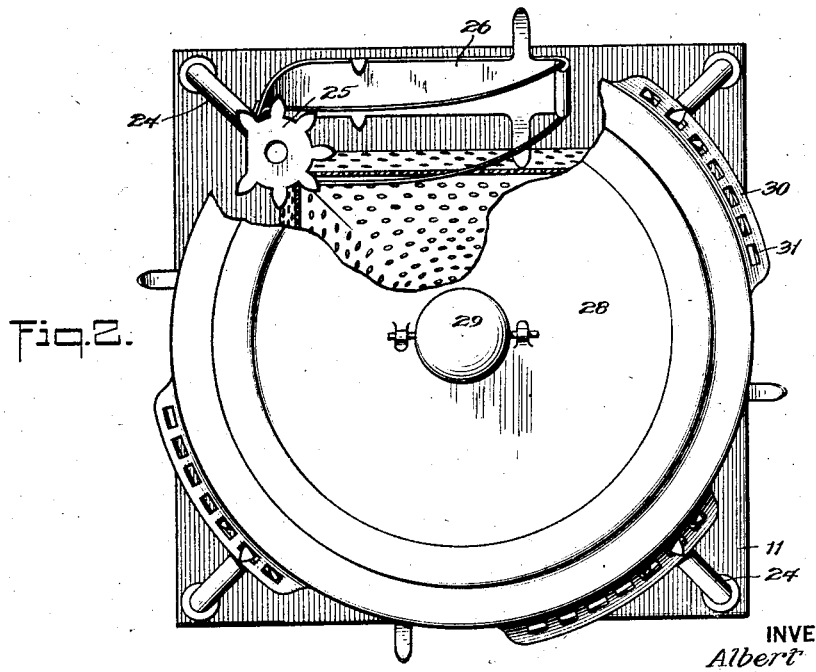

1,612,809

UNITED STATES PATENT OFFICE.

ALBERT GUISSART AND EDGAR H. BARBE, OF NEW YORK, N. Y.

ROTATABLE TOASTER.

Application filed June 2, 1922, Serial No. 565,437. Renewed June 26, 1926.

The invention relates in general to a device for toasting bread or other similar material and the invention specifically relates to that type of toasters in which the slices of bread may be reversed in position relative to the heating unit so as to be toasted on opposite sides without removing the bread slices from the toaster. More definitely defined the invention relates to a form of toaster which is designed to be positioned over a gas burner, a stove or other source of heat and in which the hot air, the products of combustion, or other gaseous heat conducting vehicle is caused to move upwardly through the toaster to affect the toasting operation.

Such devices heretofore known are objectionable in that the lower part of the toaster, which is, of course, positioned closer to the source of heat energy than the upper part, quickly reaches a higher temperature than the upper parts. The effect of this unequal heating is that the part of the radiator or other heat conducting part adjacent the lower portion of the slices of bread becomes extremely hot. The bread is unevenly toasted and not infrequently is burned along its lower edges before the upper portions are sufficiently toasted.

Accordingly, the primary object of the invention is to provide a form of toaster in which the slice, or slices, of bread may be toasted on opposite sides as before suggested and additionally the bread may be toasted uniformly over the entire surface exposed to the heating effect, irrespective of the fact that the heat is supplied to the toaster at one place.

Broadly, this phase of the invention is attained by two features of construction each contributing to effect the desired result. First, the hot gases are caused to pass through a Venturi tube shaped passageway, the constricted portion of which is so designed, relative to the upper perforated radiator forming part, that the gases are directed away from the lower portion of the heat radiator. This has the effect of forming a vacuous space adjacent the lower portion of the radiator which tends to keep it cool. The second feature is to provide for the admission of cooling air into this vacuous space, which air will tend further to maintain the lower portion of the radiator cool or at least at the temperature approximating the temperature of the upper portion of the radiator.

Still another object of the invention is to provide a simplified form of toaster of the type outlined, which will be characterized by a minimum number of parts, each readily formed, and in which the parts can be assembled into a completed structure without necessity for the use of skilled labor.

Incidental to the last desideratum another object of the invention is to provide a simple form of construction by means of which a plurality of bread holders may be readily reversed in position so as to bring opposite sides of the bread carried thereby into position facing the heating radiator of the toaster.

Various other objects and advantages of the invention will be in part obvious from an inspection of the accompanying drawings and in part will be more fully set forth in the following particular description of one form of mechanism embodying our invention, and the invention also consists in certain new and novel features of construction and combination of parts hereinafter set forth and claimed.

In the accompanying drawings:—

Figure 1 is a view partly in front elevation and partly in vertical section of a gas toaster constituting a preferred embodiment of the invention; and Figure 2 is a plan view looking down upon the structure shown in Figure 1 and with parts of the same broken away to show details of construction.

In the following description and in the claims, parts will be identified by specific names for convenience of expression but they are intended to be as generic in their application to similar parts as the art will permit.

In the accompanying drawings there is shown a one-piece stamped sheet metal shell 10 which includes a wide spreading flanged base plate 11 adapted to be positioned on top of the stove or other support. The base plate is provided centrally thereof with an opening 12 which is designed to be positioned over the gas burner or other source of heat. A frusto-pyramidal deflector 13 extends upwardly from the base plate and outlines the opening 12. An outwardly extending and horizontally disposed flange 14 encircles the constricted upper end 15 of the deflector 13. The ledge 14 is provided with a plurality of cold air bleeding ports 16 by means of which air is permitted to enter the heat conduit hereinafter described and formed in part by the deflector 13.

The portion of the shell 10 above the ledge 14 is a four sided pyramid at its lower portion converging into a circular or rather conical form at its upper end where it is connected to a top plate 17. The portion of the shell above the ledge 14 is provided with perforations 18 and constitute an outer radiator 19. A similarly shaped inner radiator 20 provided with perforations 21 rests upon the ledge 14 adjacent its connection with the outer radiator and extends to the top plate adjacent the center thereof. It will be understood that the heat conducting passageway formed by the deflector 13 and inner radiator 20 constitutes in effect a Venturi tube with the opening 13 forming the constricted portion of the passageway.

The inner radiator is more inclined from the vertical than the outer radiator thus forming an air space 22 between the radiators which air space increases in cross-section from its lower to its upper end. From this construction it will be seen that the upper part of the inner radiator, which is usually hotter than the central part, is spaced a greater distance from the bread to be toasted than the lower part.

The four adjacent corners of the base and top plates are connected by inclined rods 23 on each of which rods is mounted a bread holder shaft 24, the upper end of which shafts is provided with a spur gear 25. Each shaft is provided with a skeleton form of bread holder 26 and it is to be understood that the rotation of a gear 25 will cause the bread holder 26 connected thereto to swing outwardly over an angle of about 270° from one to an adjacent side of the outer radiator, thus reversing the side of the bread slice facing the radiator, as is well known in similar constructions.

The center of the top plate 17 is provided with a pivoting pin 27 upon which is rotatably mounted a stamped gear plate 28 adapted to be rotated by means of a turning knob 29 extending above the same. The gear plate constitutes a heat deflector for the top of the toaster and is provided at its periphery with four circumferentially spaced apart and down-turned ledges 30, provided with slots 31 which coact to form an integral gear designed to mesh with the adjacent gear 25.

In operation and assuming that the toaster is disposed in position with the opening in the base plate over a gas-burner or other heat source, and that one or more of the bread holders are charged with slices of bread. The rising heat current passing through the unperforated deflector will tend to move inwardly towards the central axis of the heat conduit to rise in the inner radiator as is usual in such constructions and eventually escape through the perforations in the inner radiator. The upwardly moving heat current will tend to create a vacuum just above the air bleeding ports so that but little heat is conducted directly to the outer bread contacting radiator. This space will tend to become filled with air leaking into the same slowly through the bleeder ports.

This will assist in keeping the lower part of the toaster cool and will tend to dilute the hot gases as they pass into the lower part of the inner radiator. The lower portion of the bread slices will be relatively close to the lower, comparatively cold, portion of the inner radiator while the upper portion of the bread slice will be separated by the air space from the upper, relatively hot portion of the inner radiator. The radiators are so designed that the amount of heat transferred to the bread slice will be substantially equal per unit area exposed over the whole portion of the slice. In this way the bread will be toasted uniformly over the entire inner face, even though the lower portion of the heater, which is nearest the source of heat, may be intensely heated.

As soon as one side of the slice or slices becomes sufficiently toasted the operator grasps the insulator handle at the top of the toaster and by a partial rotation of the gear plate reverses the position of all of the bread slices relative to the outer sides of the radiator. In this way both sides of each piece of bread is uniformly toasted over their entire surface.

While we have shown and described, and have pointed out in the annexed claims, certain novel features of our invention, it will be understood that various omissions, substitutions and changes in the form and details of the device illustrated and in its operation may be made by those skilled in the art without departing from the spirit of the invention.

Having thus described our invention, we claim:

1. In a toaster, the combination of a base plate having an opening adapted to be disposed over a source of heat, an upwardly and inwardly extending deflector outlining the opening, an outwardly extending ledge at the upper end of the deflector, said ledge provided with a cold air bleeding port, an inner perforated radiator extending upwardly from the ledge, an outer perforated radiator extending upwardly from the ledge, said radiators being spaced apart at their upper portions to form an air space therebetween and a bread holder carried by said base for positioning bread against the outer radiator.

2. In a toaster, means for forming a Venturi-shaped upstanding heat conduit, said conduit provided with a cold air bleeder adjacent its constricted portion, the upper portion of said conduit being perforated and constituting an inner radiator, an outer radiator coacting with the inner radiator to form an air space between and a bread holder for positioning bread adjacent the outer radiator.

3. A toaster including an inner radiator substantially in the form of a pyramid having perforations in the wall thereof and opened at its lower end to receive heat directed therethrough into the interior of the inner radiator and an outer pyramidal shaped, flat, four sided radiator facing the inner radiator for its entire height, said radiators being spaced apart at their upper edges and contacting at their lower edges to define an air space triangular shape in axial cross-section and adapted to position slices of bread to be toasted in spaced relation to the inner radiator at the top thereof and close to the inner radiator at the lower edge thereof and the juxtaposed sides of the radiators being connected to each other at their lower edges.

4. A toaster including a pair of concentrically disposed radiators, each frusto-pyramidal provided with perforations and spaced apart horizontally at their upper ends to form an air space therebetween and contacting at their lower edges, means for directing heat into the interior of the inner radiator and means for positioning slices of bread against the outer side of the outer radiator.

5. A toaster including an upstanding tubular heat conduit, with the lower part in the form of a frustrum of a pyramidal and free of perforations and the upper part perforated, and having its base offset outwardly from the upper edge of the imperforate lower part a radiator facing the part provided with the perforations and rotatable means for positioning at will opposite sides of a slice of bread against said radiator.

6. A toaster including an upstanding tubular heat conduit having a Venturi shaped part, the part above the constriction being perforated, a radiator facing and in spaced relation to the perforated part and means for positioning a slice of bread against said radiator.

7. A toaster including a base plate provided with an opening, an upwardly extending deflector open at its top to form a Venturi tube effect extending above the base plate and outlining said opening and a radiator having its lower part offset outwardly from said deflector.

8. In a toaster, the combination of an upstanding heat conduit, a radiator offset outwardly from said conduit, means for admitting cooling air to the lower part of the radiator and means of positioning a slice of bread adjacent the outer side of said radiator.

9. A toaster including means forming a Venturi-tube shaped heat conduit, a radiator disposed in position to receive heat from the conduit and means for positioning slices of bread adjacent said radiator.

10. A toaster including means forming a Venturi-tube shaped heat conduit, means for supplying air to the conduit adjacent its constricted portion and means for positioning slices of bread in advance of said constricted portion.

11. In a toaster, the combination of a top plate a gear plate mounted above the same for rotary movement about a vertical axis, a portion of the outer edge of the gear plate extending beyond the top plate, down turned, and provided with apertures forming a gear effect, a bread holder having its upper end journalled in the top plate and provided with a spur gear in mesh with the apertures in the turned down portion of the gear plate.

12. In a toaster, the combination of an upstanding radiator, means for conducting heat to said radiator, and means for cooling the lower part of the radiator.

This specification signed this 20th day of May, 1922.

ALBERT GUISSART.
EDGAR H. BARBE.